(12) United States Patent
Bax et al.

(10) Patent No.: US 11,909,725 B2
(45) Date of Patent: *Feb. 20, 2024

(54) AUTOMATIC PRIVACY-AWARE MACHINE LEARNING METHOD AND APPARATUS

(71) Applicant: YAHOO ASSETS LLC, Dulles, VA (US)

(72) Inventors: Eric Bax, Sierra Madre, CA (US); Charlotte Bax, Sierra Madre, CA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,939

(22) Filed: Aug. 31, 2022

(65) Prior Publication Data

US 2022/0417226 A1 Dec. 29, 2022

Related U.S. Application Data

(63) Continuation of application No. 17/172,679, filed on Feb. 10, 2021, now Pat. No. 11,438,314.

(51) Int. Cl.
*H04L 9/40* (2022.01)
*G06N 20/00* (2019.01)

(52) U.S. Cl.
CPC ......... *H04L 63/0428* (2013.01); *G06N 20/00* (2019.01)

(58) Field of Classification Search
CPC ............................ G06N 20/00; H04L 63/0428
USPC .......................................................... 726/26
See application file for complete search history.

(56) References Cited

U.S. PATENT DOCUMENTS

| 5,768,426 A | 6/1998 | Rhoads | |
|---|---|---|---|
| 7,805,764 B1 | 9/2010 | Carson | |
| 8,161,463 B2 * | 4/2012 | Johnson | H04L 9/002 717/136 |
| 8,165,305 B2 * | 4/2012 | Chrysler | H04L 9/0894 707/705 |
| 9,043,866 B2 * | 5/2015 | Sprague | G06F 21/00 726/28 |
| 10,572,475 B2 | 2/2020 | Li et al. | |
| 10,708,236 B2 * | 7/2020 | Takahashi | H04L 63/0227 |

(Continued)

OTHER PUBLICATIONS

Bloomberg News, "Apple's Tim Cook Calls for More Regulations on Data Privacy," 2 pages (2018).

(Continued)

*Primary Examiner* — Amare F Tabor
(74) *Attorney, Agent, or Firm* — James J. DeCarlo; Greenberg Traurig, LLP

(57) ABSTRACT

Disclosed are systems and methods for improving interactions with and between computers in content generating, searching, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for privacy-aware machine learning using an improved data encoding that withholds more information. The disclosed systems and methods encode a corpus of data and encode each query used in searching and generating query results from the corpus of encoded data.

20 Claims, 8 Drawing Sheets

(56) References Cited

U.S. PATENT DOCUMENTS

| | | | |
|---|---|---|---|
| 10,810,195 | B2 | 10/2020 | Kandukuri et al. |
| 11,042,544 | B2 | 6/2021 | Finlay et al. |
| 11,169,995 | B2 | 11/2021 | Fender et al. |
| 2017/0243131 | A1* | 8/2017 | Kephart .................. G06F 16/00 |
| 2019/0102411 | A1 | 4/2019 | Hung et al. |
| 2020/0145384 | A1* | 5/2020 | Chauhan ................. G06F 16/95 |
| 2021/0248263 | A1* | 8/2021 | van Liesdonk ......... H04L 9/008 |

OTHER PUBLICATIONS

Giacomelli et al., "Privacy-preserving Collaborative Prediction using Random Forests," pp. 1-19 (2018).

Bloom, Jonathan M., "Secure multi-party linear regression at plaintext speed," pp. 1-9 (2019).

Halevi et al., "Bootstrapping for HElib," International Association for Cryptologic Research, pp. 641-670 (2015).

Shao et al., "Privacy-aware Ranking with Tree Ensembles on the Cloud," SIGIR' 18, Jul. 8-12, 2018, Ann Arbor, MI (2018).

Popa et al., "An Ideal-Security Protocol for Order-Preserving Encoding," IEEE Symposium on Security and Privacy, Berkeley, CA, 2013, pp. 463-477, doi: 10.1109/SP.2013.38 (2013).

McFee et al., "Metric Learning to Rank," Proceedings of the 27th International Conference on Machine Learning, Haifa, Israel, 8 pages (2010).

Kedem et al., "Non-linear Metric Learning," Proceedings of the 25th International Conference on Neural Information Processing Systems—vol. 2, pp. 2573-2581 (2012).

Vitter, Jeffrey Scott, "Random Sampling with a REservoir," ACM Transactions on Mathematical Software, vol. 11, No. 1, pp. 37-57 (1985).

Langford, John, "Tutorial on Practical Prediction Theory for Classification," Journal of Machine Learning Research 6, pp. 273-306 (2005).

Hoeffding, Wassily, "Probability Inequalities for Sums of Bounded Random Variables," American Statistical Association Journal, pp. 13-30 (1963).

Maurer et al., "Empirical Bernstein Bounds and Sample Variance Penalization," 9 pages (2009).

Audibert, Jean-Yves, "PAC-Bayesian Statistical Learning Theory," 178 pages (2004).

Bax et al., Speculate-Correct Error Bounds for k-Nearest Neighbor Classifiers, Pattern Recognition, pp. 1-28 (2018).

Fan et al., "Development of Sampling Plans by Using Sequential (Item by Item) Selection Techniques and Digital Computers," Journal of the American Statistical Association, abstract only (2012).

Cover et al., "Nearest neighbor pattern classification," IEEE Transactions on Information Theory, abstract only (1967).

Vaidya et al., "Privacy-preserving SVM classification," abstract only (2007).

* cited by examiner

AUTOMATIC PRIVACY-AWARE MACHINE LEARNING METHOD AND APPARATUS

CROSS REFERENCE TO RELATED APPLICATIONS

This application is a continuation of, and claims priority from, co-pending U.S. patent application Ser. No. 17/172,679, filed Feb. 10, 2021, entitled Automatic Privacy-Aware Machine Learning Method And Apparatus, the contents of which are hereby incorporated by reference.

FIELD OF THE DISCLOSURE

The present disclosure relates to improvements to machine learning systems and specifically to ensuring secure use of sensitive, private data in machine learning.

BACKGROUND

Machine learning is a type of artificial intelligence that uses data to train a computing system to better analyze and use information and provide improved computing functionality. Some examples of computerized systems that use machine learning include without limitation, internet search engines, electronic messaging systems, online item recommendation systems, voice recognition systems, etc.

A machine learning computing system typically uses a machine learning algorithm and training data to generate a machine-learned model (e.g., a statistical data model) that can be tested (using test data) for accuracy and then used to analyze information input to the model to provide a result of its analysis. By way of one non-limiting example, an internet search engine or online item recommendation system might use a trained model to be able to predict user preferences and provide more relevant search results or item recommendations. By way of another non-limiting example, an electronic messaging system can use a trained model to identify wanted or unwanted (e.g., spam) messages.

Typically, the training data used as input to a machine learning algorithm comprise a number of training data examples (also referred to as data records, feature vectors, etc.), each data example comprising a number of features (or fields) and a corresponding number of values.

SUMMARY

It has been recognized that a problem arises when the data examples used as training data for a machine learning algorithm is sensitive data, such as user data. The problem involves the question of how to preserve privacy while still being able to use the data examples as training data. The problem is especially true in a case where the data examples are maintained by one entity (e.g., a data provider) and the machine learning capability is provided by another entity (e.g., a machine learning service provider, or service provider).

The present disclosure provides novel systems and methods for privacy-aware machine learning using an improved data encoding that withholds more information resulting in greater data privacy. Embodiments of the present disclosure use machine learning techniques that use encoded training data to preserve privacy. The information encoding and machine learning provided by embodiments of the present disclosure result in improved data privacy and greater computing and resource efficiencies. In accordance with one or more embodiments, data records (or training examples) are encoded in a way that avoids revealing information about the record's field values and about the ordering of values from different fields. In addition and in accordance with one or more embodiments, each query is encoded to prevent unauthorized access and provide additional privacy for the information.

One example of a current data encoding approach is fully homomorphic encoding, which maps values to encoded values in a way that allows addition and multiplication to be performed on the encoded values to produce encoded sums and products. This allows classification methods that use arithmetic operations, such as regression and curve-fitting. The drawback is very slow computations, making fully homomorphic encoding inappropriate for big-data settings. In addition and since each value has a corresponding encoded value, a breach is possible over time. For example, the encoding might be recognized through pattern analysis.

One type of statistical modeling generated by machine learning is a decision tree. A decision tree comprises a set of nodes assembled in a hierarchy and comprising a root node, intermediate nodes and leaf nodes. The root and each intermediate node represents a decision point and each branch from the node represents a decision made that yields a path to a next node. The next node may be an intermediate node or a leaf (or end) node. Decision trees may rely on access to information about orderings of values, because each decision begins at the root, and then subsequent nodes may be selected based on whether feature values are greater or less than some threshold.

One type of data encoding that preserves order from the raw data to the encoded data is referred to as order-preserving encoding. Since this type of encoding preserves order, it can be used with a decision tree (or trees) statistical model. Since order is preserved, the decision made at a particular node can depend on determining whether a field value is above a threshold. Order-preserving encoding preserves less information about the data than fully homomorphic encoding. It enables faster operations and withholds more information from the service provider. However, order-preserving encoding still releases information about order. Since ordering in the raw data is preserved in the encoded data using order-preserving encoding, the ordering of the encoded data may be used in attempts to determine the raw data, which can result in information leaks over time.

The information encoding used in accordance with one or more embodiments does not rely on fully homomorphic encoding and does not need to preserve order needed to perform order comparisons (e.g., such as those allowed with order-preserving encoding). This results in greater data privacy than offered by other encoding schemes. In addition, the information encoding provided in accordance with one or more embodiments facilitates full-speed equality comparisons, such as those used with histogram-type classifications (e.g., voting over in-sample examples that share all field values with the input example being classified).

Embodiments of the present disclosure provide a classification method that iteratively decreases the number of field-value matches needed (or, put another way, increases a minimum distance to a search query) until a pre-specified (or threshold) number of encoded records are found for use in determining an indicator of label positivity—a positive label frequency (or frequency of occurrence). By way of a non-limited example, the classification method can be a classifier, such as and without limitation a k-nearest neighbors classifier, which allows modified forms of k-NN metric learning and validation. By way of one non-limiting example, the k-NN classifier can use all encoded records within a minimum distance to the search query needed to have at least k encoded records. As yet another non-limiting example, the k-NN classifier can use a random tie-breaking among encoded records with greatest distance (relative to a search query) as a mechanism to limit the number of encoded records selected to k encoded records.

According to some embodiments, the disclosed systems and methods first encode each data record (also referred to herein as a training example) comprising a number of values (corresponding to fields, or features) to be used by a machine learning algorithm. To further illustrate, each record, X can be a sequence of field values, $x_1, \ldots, x_r$. The fields of each record can comprise a number of types of fields (and corresponding field values) that can be used by a machine learning algorithm. One type of field (and corresponding value) is an input field (and corresponding value). One example of such input fields (with corresponding values) include user data, which may include demographic information such as age, gender, geographic location, income, etc., online browsing activity, and the like. Another type of field (and corresponding value) is an output (or label) field (and corresponding value). A label field (and value) is an output, or information sought. Some non-limiting examples include identifying a user content preference, an indication whether a user will purchase an item if the user clicks on an ad, and the like.

By way of a further illustration, an unencoded record, X comprises a set of unencoded values (e.g., $x_1, \ldots, x_r$), each corresponding to a field of the encoded recorded. Using the data encoding described herein in connection with one or more embodiments, each field's value is encoded to generate a set of encoded values (e.g., $x'_1, \ldots, x'_r$), each corresponding to a field of an encoded record, X'. In addition and since field order is not needed with the encoding provided by embodiments of the present disclosure, the encoded field values of the encoded record, X', can be randomly shuffled resulting in a random ordering of the field values of the encoded record, X', which differs from the ordering of the field values in the unencoded record, X.

In accordance with one or more embodiments, in a case of a field with non-categorical values (e.g., an excessive number of possible values), a range can be determined for the non-categorical values, and the value range can be split into subranges, each of which is assigned a value for use in encoding the unencoded values used in such a field. More particularly, for encoding an unencoded value used in such a field, the subrange into which the unencoded value falls is determined and the unencoded value is replaced by the identified subrange's assigned value (e.g., assigned encoding value), such that the indicator of the subrange into which an encoded value falls is used as the encoded value corresponding to the unencoded value.

By way of a non-limiting example, assume that real numbers are the possible values for a non-categorical field. The range of real numbers that encompass the possible real-number unencoded values can be split into a number of subranges, and each unencoded value can be encoded using an encoded (or encoding) value (e.g., subrange indicator) associated with the subrange into which the unencoded value falls (e.g., a value representing the subrange into which the unencoded value falls).

In accordance with one or more such embodiments, an unencoded value's encoded value is determined based on both its value and its field. In other words, a field and value pair is used to encode a field's value. For example, assume that a record includes first and second fields, the first field has 2 (two) possible values and the second field has 5 (five) possible values, the unencoded values used in the first field can be encoded using encoded values 0 (zero) and 1 (one) and the second field's encoded values can be can encoded using encoded values 2-6 (two-six). In so doing, a given field's encoded value is unique from another field's encoded value and is exclusive to the field, so that it is not necessary to specify the field to which an encoded value corresponds. In effect, a field and the value used are both encoded. This provides an additional level of data privacy.

In accordance with one or more embodiments, the disclosed system and methods then provide a set of encoded records generated from a set of unencoded records (or training examples) to a machine learning algorithm to generate a response to a query. By way of one non-limiting example, the set of encoded records can be sent to a service provider as training examples, so that the service provider can generate a response to queries received from the data provider(s) using a machine learning algorithm. In accordance with one or more embodiments, each query is also encoded before being sent to the service provider.

By way of a non-limiting example, the service provider may use a corpus of encoded training records generated from a corpus of unencoded records to respond to an encoded query using a classification-type machine learning algorithm implementing a classifier, such as a histogram-type classifier, a k-nearest neighbors classifier, etc.). In the case of a k-nearest neighbor (k-NN) classifier, a lazy learning method can be used, such that the training of the classifier can be delayed until a response to a query is to be generated. Lazy classifiers are useful for large, continuously changing training datasets.

In accordance with one or more embodiments, a classifier (e.g., a k-NN classifier) can be used (e.g., by a service provider) with a corpus of encoded records (or training examples) to generate a response to an encoded query, (Q', Y'), where the response includes a frequency, p, of positive labels (or number of encoded records having at least one label in common with the encoded search query) and a number, n, of encoded records examined to find the positive label frequency, p. An encoded record that is determined to have at least one label in common with the search query can also be referred to herein as a positive instance or positive vote. By way of one non-limiting example, p=100 (one hundred) and n=101 (one hundred and one) indicates that a search using query, Q, used (e.g., searched) 101 (one hundred and one) encoded records (collected by the service provider from one or more data providers) and found 100 (one hundred) encoded records having at least one encoded label in common with the search query—having some $x'_i \in Y^i$, of the 101 records (in the encoded corpus of records) searched.

In accordance with one or more embodiments, the systems and methods then use the query response to determine a result. The query response can comprise the number, n, of encoded records searched and the positive label frequency, p, indicating a number of the n encoded records having at least one encoded label in common with the encoded label(s) included in the query. The data provider can then use the values of p and n to determine whether the result of the query is a positive result, or conversely a negative result.

In accordance with one or more embodiments, the query result can be used by the data provider. By way of one non-limiting example, an estimated probability determined by the classifier can be used together with a threshold to determine whether the query label is true (or positive) or false (or negative).

In accordance with at least one embodiment, the estimated probability provided by a query result (or response) to an encoded query can be an estimate indicating whether or not the encoded value of a label field is inferable given the encoded values of the input fields of an encoded query. By way of some non-limiting example, the input fields of a query can include user data information (e.g., demographic information, online browsing activity, and the like) encoded in a manner described herein, and each label field can represent something that might be inferred given the input user data. Examples of information that might be inferred include whether or not a user that has the user data information has a preference for a type of content, will purchase an item if the user clicks on an ad, and the like.

It will be recognized from the disclosure herein that embodiments of the instant disclosure provide improvements to a number of technology areas, for example those related to systems and processes that handle or process sensitive data, such as but not limited to, search engines, local and/or web-based applications, online item (e.g., content, media, etc.) recommendation platforms, online advertising, electronic commerce, electronic social networking platforms and the like. The disclosed systems and methods can effectuate increased speed and efficiency in the ways that encoded data can be used in machine learning, thereby improving data privacy in machine learning environments, as the disclosed systems and methods, inter alia, use machine learning techniques that use encoded data records to preserve privacy. The information encoding and machine learning provided by embodiments of the present disclosure result in improved data privacy and greater computing and resource efficiencies. In accordance with one or more embodiments, data records are encoded in a way that avoids revealing information about the record's field values and about the ordering of values from different fields. In addition and in accordance with one or more embodiments, each query is encoded to prevent unauthorized access and provide additional privacy for the information.

In accordance with one or more embodiments, a method is disclosed which includes storing, using a data store accessible by a computing device, sensitive data, the sensitive data comprising a plurality of records, each record, of the plurality of records, comprising a plurality of unencoded values corresponding to a plurality of fields of the record; determining, via a computing device and using the private data, a set of unencoded values for each field of the plurality of fields; determining, via the computing device, a set of encoded values exclusive to each field of the plurality of fields, the determining comprising, for each field of the plurality using the set of unencoded values determined for the field; generating, via the computing device and for each field of the plurality of fields, a mapping between the set of encoded values exclusive to the field and the set of unencoded values determined for the field, each unencoded value in the set having a corresponding encoded value; generating, via the computing device, a plurality of encoded records, the generating comprising replacing each unencoded value in the plurality of records with an encoded value based on a field in the plurality of fields corresponding to the unencoded value and the mapping determined for the corresponding field; transmitting, via the computing device and to a service provider, the plurality of encoded records; generating, via the computing device, an encoded query using an unencoded query, each unencoded value of the unencoded query corresponding to a field of the plurality of fields, the generating comprising replacing each unencoded value from the unencoded query with an encoded value based on a field of the plurality of fields corresponding to the encoded value and the mapping generated for the corresponding field; transmitting, via the computing device, the encoded query to the service provider; and receiving, via the computing device and from the service provider, a response to the encoded query.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for privacy-aware machine learning using an improved data encoding that withholds more information.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
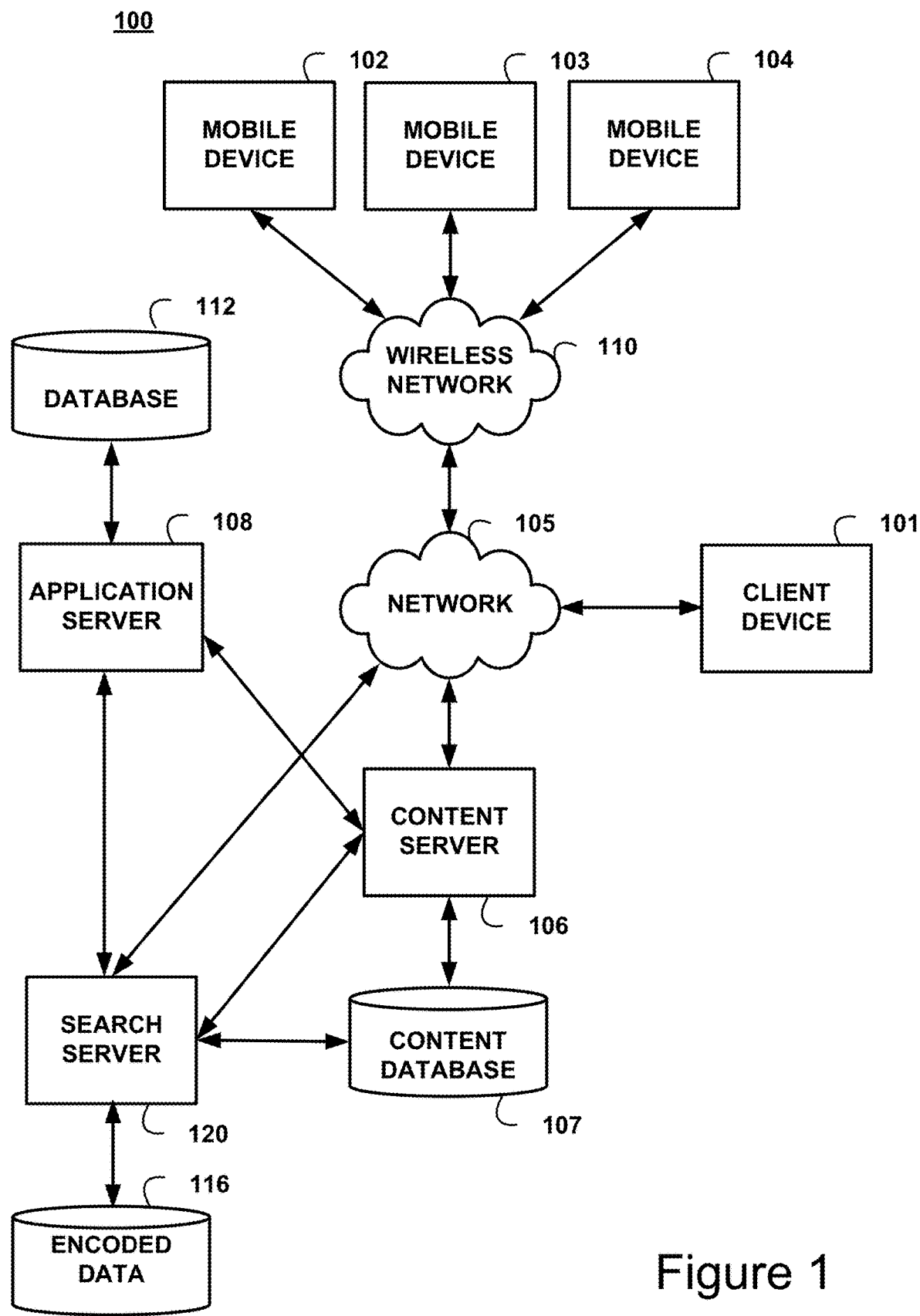
FIG. 1 is a schematic diagram illustrating an example of a network within which the systems and methods disclosed herein could be implemented according to some embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

With the widespread ability to collect sensitive data (e.g., sensitive user data) and the need to use unsecure service providers, there is currently a huge demand for a data encoding and searching capability. However, existing systems are inefficient and cumbersome to use on large datasets. In addition, existing systems are subject to information leaking over time.

As such, the instant disclosure provides a novel solution addressing the immediate demand for an automated system, application and/or platform that provides privacy-aware machine learning using an improved data encoding that withholds more information. The present disclosure provides novel systems and methods for automatic value encoding that does not rely on one-to-one value encoding (such as that needed to perform arithmetic operations used permitted in fully homomorphic encoding) and does not need to preserver order needed to perform order comparisons (e.g., such as those allowed with order-preserving encoding). This results in greater data privacy than offered by other encoding schemes. The value encoding provided in accordance with one or more embodiments facilitates full-speed equality comparisons, such as those used with histogram-type classifications (e.g., voting over in-sample examples that share all field values with the input example being classified).

According to some embodiments, the disclosed systems and methods first encode each data record by encoding the values of each field in the record. The fields of each record can comprise a number of types of fields (and corresponding field values) that can be used by a machine learning algorithm. The field types can include both input and output (or label) fields. In cases in which values of a field comprise a range of values (e.g., non-categorical field values), the range of values can be split into subranges each having a subrange indicator, and an encoded value for a field can be determined to be the subrange indicator associated with the subrange into which the unencoded value falls. Additionally, an unencoded value's encoded value can be determined based on both its value and the unique values that are exclusive to a corresponding field. Each field's unique values are exclusive to that field, such that none of the values assigned to the field are used in another field.

In accordance with one or more embodiments, the disclosed system and methods then provide a set of encoded records generated from a set of unencoded records (or training examples) to a machine learning algorithm to generate a response to a query. By way of one non-limiting example, the set of encoded records can be sent to a service provider to generate a response to queries received from the data provider(s). A query is also encoded before being sent to the service provider.

In accordance with one or more embodiments, the systems and methods then use the query response to determine a result. The query response can indicate the number, n, of encoded records searched and the positive label frequency, p, indicating a number of the n encoded records having at least one encoded label in common with the encoded label(s) included in the query. The values of p and n can be used to determine an estimated probability, which can be used to determine whether or not the query result is a positive or a negative result.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as, by way of non-limiting examples, content server 106, application (or "App") server 108, search server 120 and advertising ("ad") server (not shown).

In the example shown, the application server 108 is used as an example of a data provider collecting sensitive, private data, which is stored in database 112. However, another server, such as content server 106, can be a data provider. Additionally and in the example shown, search server 120 provides an example of a service provider which uses encoded data 116 to respond to an encoded query (e.g., from application server 108) with a query result. In accordance with one or more embodiments, search server 120 can implement a machine learning algorithm, such as and without limitation a classification method that implements a classifier, such as and without limitation a k-nearest neighbors classifier, which allows modified forms of k-NN metric learning and validation.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108 and/or 120. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120, or an ad server or ad network.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
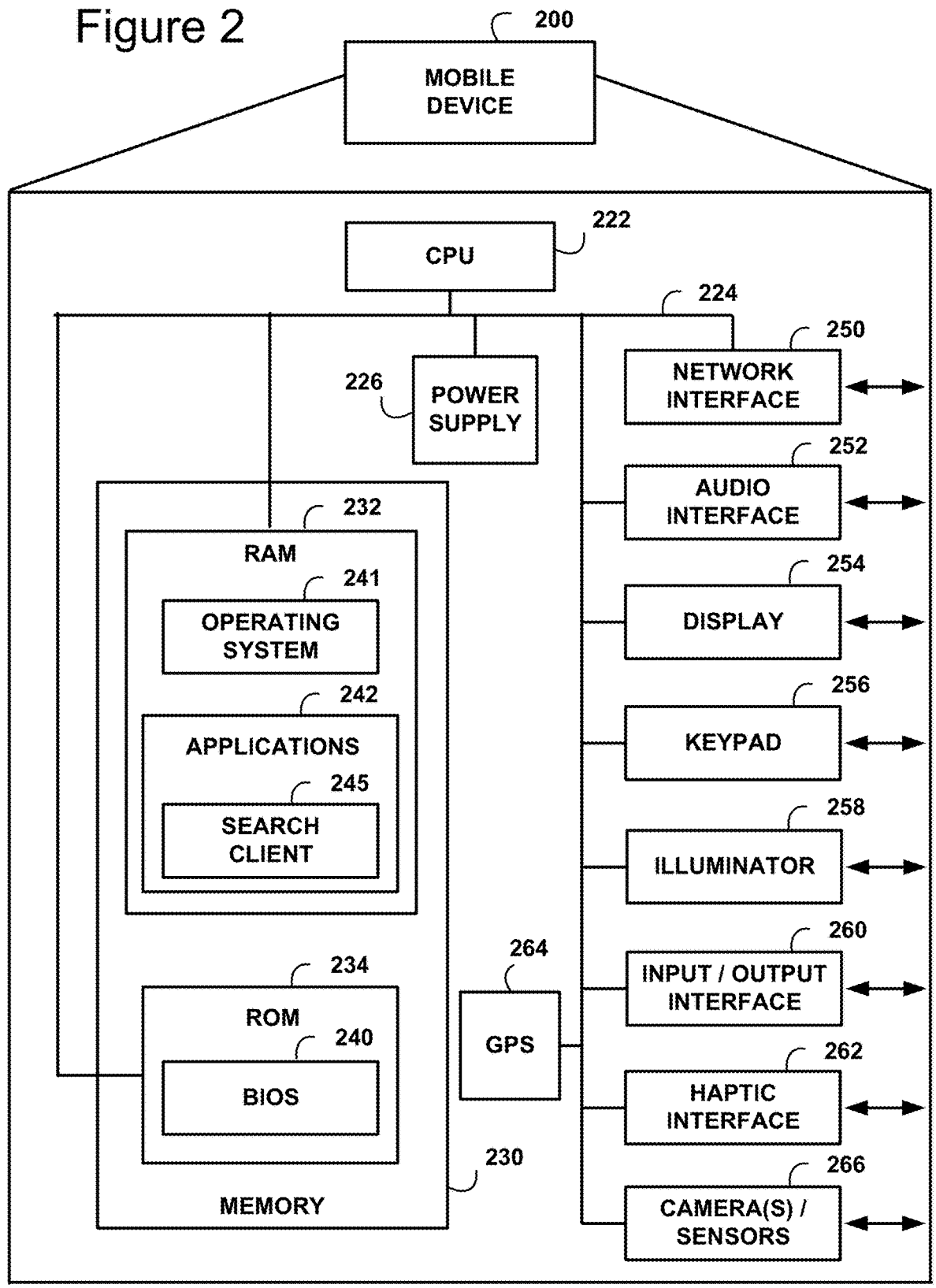
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 3:
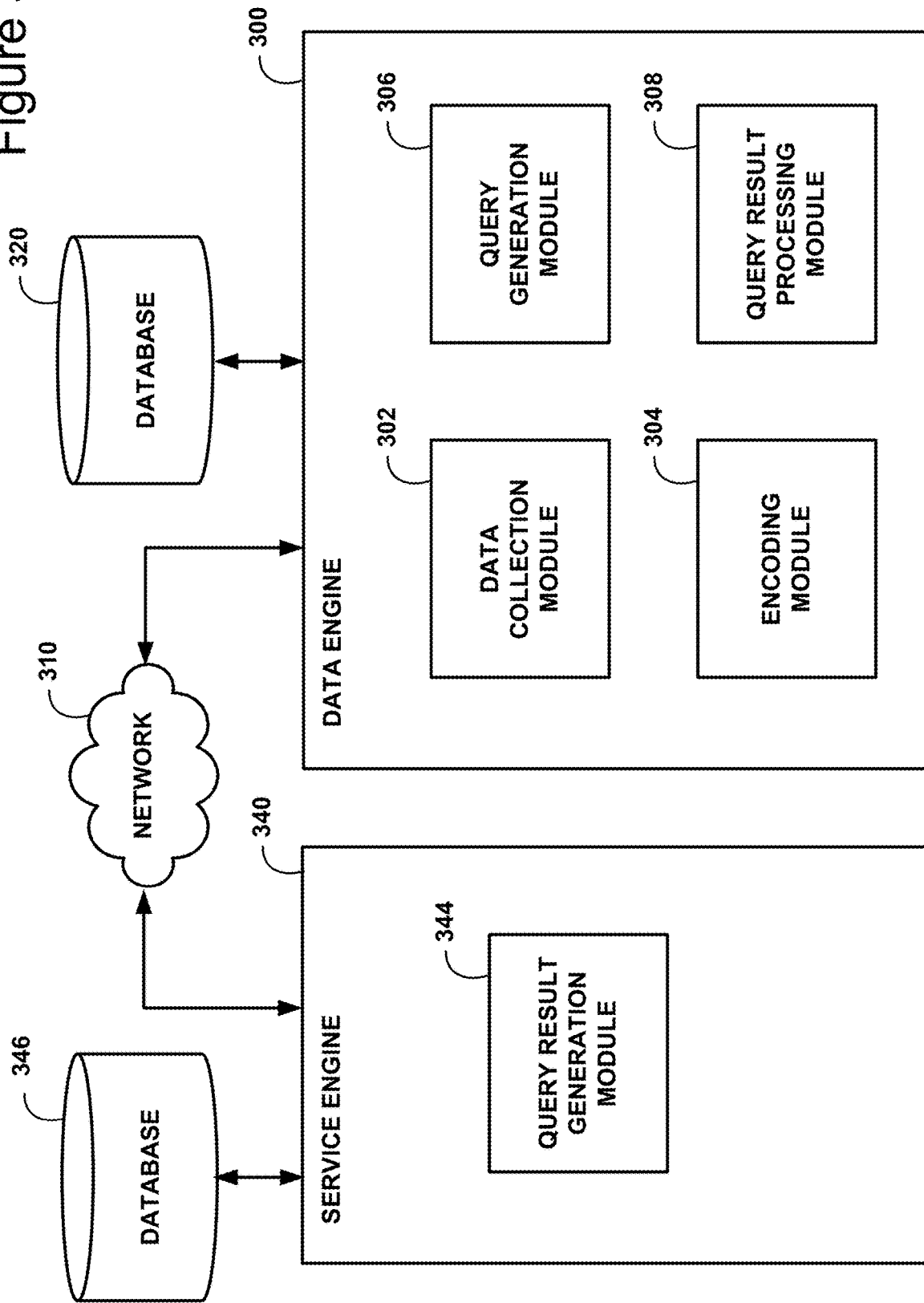
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a data engine 300 (which may be associated with a data provider, such as without limitation application server 108) and a service engine 340 (which may be associated with a service provider, such as and without limitation search server 120). Engines 300 and 340 can be provided by the same or different entities. In accordance with some embodiments, engines 300 and 340 can be the same or separate computing systems. Engines 300 and 340 can (either separately or together) be a special purpose machine or processor and could be hosted by an application server, content server, social networking server, web server, search server, content provider, email service provider, ad server, user's computing device, and the like, or any combination thereof.

Databases 320 and 346 can each be any type of database or memory, and can be associated with a server on a network (such as and without limitation a content server, search server, application server, etc.) or a user's device. Database 320 comprises a corpus of unencoded data and a corpus of encoded data resulting from an encoding of the unencoded data in accordance with one or more embodiments discussed herein.

The data stored in database 320 can comprise data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 346 can store a corpus of encoded data and a number of encoded queries received from data engine 300. The database 346 can store data and metadata associated with a machine learning algorithm (e.g., a classifier), and data generated in accordance with the machine learning algorithm.

While the discussion below will involve classification (or a classifier) as an example of a statistical machine learning algorithm that uses a corpus of encoded data, other statistical machine learning algorithms can be used.

The network 310 can be any type of network such as, but not limited to, a wireless network, a local area network (LAN), wide area network (WAN), the Internet, or a combination thereof. In accordance with one or more embodiments, the network 310 facilitates connectivity of the data engine 300 and the service engine 340. Although not shown in the example of FIG. 3, network 310 can facilitate connectivity between servicer engine 340 and database 346 and data engine 300 and database 320. Indeed, databases 320 and 346 can be directly connected with another component (e.g., service engine 340, data engine 300, etc.) by any known or to be known method of connecting and/or enabling communication between such devices and resources.

The principal processor, server, or combination of devices that comprises hardware programmed in accordance with the special purpose functions herein is referred to for convenience as data engine 300, and includes data collection module 302, data encoder module 304, query generation module 306 and query result processing module 308. The principal processor, server, or combination of devices that comprises hardware programmed in accordance with the special purpose functions herein is referred to for convenience as service engine 340, and includes query result generation module 344.

It should be understood that the provider(s) and modules discussed herein are non-exhaustive, as additional or fewer providers and/or modules (or sub-modules) may be applicable to the embodiments of the systems and methods discussed. The operations, configurations and functionalities of each module, and their role within embodiments of the present disclosure will be discussed with reference to FIGS. 4-7.

As discussed in more detail below, the information processed by data engine 300 or service engine 340 can be supplied to databases 320 and 346 (respectively) in order to ensure that the information housed in each database is up-to-date as the disclosed systems and methods leverage real-time information, as discussed in more detail below.

Figure 4:
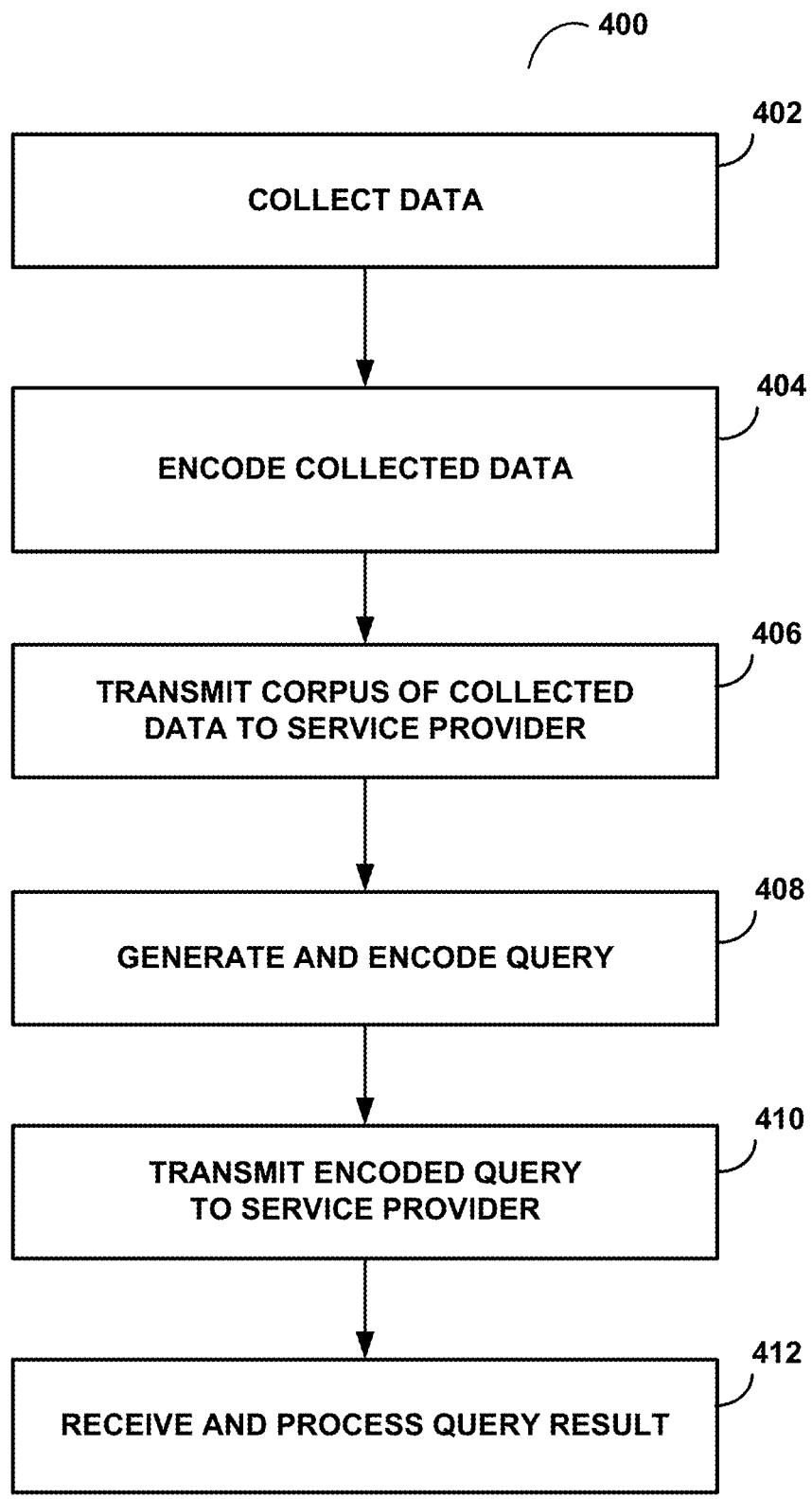
FIGS. 4-7 are each a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for privacy-aware machine learning using an improved data encoding that withholds more information resulting in improved data privacy. According to some embodiments, as discussed herein with relation to FIG. 4, the process involves automatically collecting sensitive, private data (e.g., user data)—a corpus of sensitive, private data. For privacy purposes, the data corpus (e.g., data collected and stored in database 320) is encoded before being made available for analysis or searching—e.g., before being made available to a service (e.g., search server 120, service engine 340 or other service provider). To provide further data privacy and avoid unauthorized access, access to the resulting corpus of encoded data can be limited encoded queries.

In accordance with one or more embodiments, an unencoded corpus comprises a number of encoded records, each of which comprises a number of encoded values corresponding to a number of fields of the record. The unencoded corpus is encoded in a manner that avoids revealing information about each record's fields, field values and the ordering of the fields/values used in the unencoded corpus used to generate the encoded corpus. In accordance with embodiments, a query used to access the encoded data is also encoded using an encoding scheme similar to that used for the corpus of unencoded data. The encoding of the data and queries affords data privacy and restricts access to the data. Embodiments of the present application provide a k-NN classifier operating in a manner discussed herein for responding to an encoded query of the encoded corpus.

At step 402, which is performed by data collection module 302 of data engine 300, sensitive data is collected, e.g., stored in database 320. By way of a non-limiting example, the sensitive data can comprise user data, such as and without limitation online browsing activity, demographic user data (e.g., age, gender, geographic location, occupation, etc.), income, and the like. By way of a further non-limiting example, the browsing activity may comprise online content selections (or clicks) made by the user, opinions (e.g., comments, likes, dislikes, etc.) expressed by the user, etc.

At step 404, which is performed by encoding module 304 of data engine 300, a corpus of collected data is encoded. Step 404 can be performed periodically to encode new data collected at step 402.

According to some embodiments, the corpus comprises a number of records (or examples), and each record, X can be a sequence of field values, $x_1, \ldots, x_r$. The fields of each record can comprise a number of types of fields (and corresponding field values) that can be used by a machine learning algorithm. One type of field is an input field. Another type of field is a label (or output) field. Both types of fields can be used by a statistical machine learning algorithm (e.g., such as a classifier operating in a manner discussed herein). Both types of fields can be used in a query (e.g., a query encoded in a manner discussed herein) used to search a data corpus (e.g., a corpus of data encoded in a manner discussed herein).

In accordance with at least one embodiment, a response to an encoded query includes an estimate indicating whether or not the encoded value of a label field is inferable given the encoded values of the input fields of an encoded query. By way of some non-limiting example, the input fields of a query can include user data information (e.g., demographic information, online browsing activity, and the like), and each label field can represent something that might be inferred given the input user data. Examples of information that might be inferred include whether or not a user that has the user data information has a preference for a type of content, will purchase an item if the user clicks on an ad, and the like.

By way of a further illustration, an unencoded record, X comprises a set of unencoded values (e.g., $x_1, \ldots, x_r$), each corresponding to a field of the encoded recorded. Using the data encoding described herein in connection with one or more embodiments, each field's value is encoded to generate a set of encoded values (e.g., $x'_1, \ldots, x'_r$), each corresponding to a field of an encoded record, X'. In addition and since field order is not needed with the encoding provided by embodiments of the present disclosure, the encoded field values of the encoded record, X', can be randomly shuffled resulting in a random ordering of the field values of the encoded record, X', which differs from the ordering of the field values in the unencoded record, X.

In accordance with one or more such embodiments, an unencoded value's encoded value is determined based on both its value and its field. In other words, a field and value pair is used to encode a field's value. For example, assume that a record includes first and second fields, the first field has 2 (two) possible values and the second field has 5 (five) possible values, the unencoded values used in the first field can be encoded using encoded values 0 (zero) and 1 (one) and the second field's encoded values can be can encoded using encoded values 2-6 (two-six). In so doing, a given field's encoded value is unique from another field's encoded value and is exclusive to the field, so that it is not necessary to specify the field to which an encoded value corresponds. In effect, a field and the value used are both encoded. This provides an additional level of data privacy. As can be seen from the example, the set of encoded values determined for a given field is an exclusive set of encoded values that are not reused for another field.

To further illustrate, assume that the first field is gender and the second field is location, encoded values 0 (zero) and 1 (one) can be used to encode the gender field and encoded values for the location field can commence with 2 (two) through 6 (six), the number of possible unencoded values, etc. Using this approach, each encoded value is exclusively assigned to one field and corresponds to the specific field. Once mapped to an unencoded value used in the field, the encoded value is exclusive to the field and unencoded value pair. In accordance with at least one embodiment, the mapping is a one-to-one mapping from field and value to encoded value (e.g., $(i, x_i) \rightarrow x'_i$, where i is the field designator).

In accordance with at least one embodiment, each unencoded data record from the corpus of sensitive data (collected at step 402) comprises a sequence of unencoded values corresponding to a set of fields—input fields and label (or output) fields. In accordance with one or more embodiments, the set of fields of an unencoded data record as a certain sequence.

In accordance with at least one embodiment, a set of unencoded values is determined for each field in the set of fields, and a set of encoded values is determined for each field using the set of unencoded values determined for the field. Each encoded value in the set of encoded of values determined for a field is exclusive to the field. In other words, each encoded value in the set assigned to a field is exclusively assigned to the field, such that none of the encoded values in the set is used for another field.

For each field, a mapping is generated between the exclusive set of encoded values assigned to the field and the set of unencoded values determined for the field. By virtue of the mapping, each unencoded value in the set has a corresponding encoded value, which is used as a replacement for the unencoded value in an encoded record.

In accordance with one or more embodiments, in a case of a field with non-categorical values (e.g., an excessive number of possible values), a range can be determined for the non-categorical values, and the value range can be split into subranges, each of which is assigned a value for use in encoding the unencoded values used in such a field. More particularly, for encoding an unencoded value used in such a field, the subrange into which the unencoded value falls is determined and the unencoded value is replaced by the identified subrange's assigned value (e.g., assigned encoding value), such that the indicator of the subrange into which an encoded value falls is used as the encoded value corresponding to the unencoded value. Each unencoded value can then be mapped to the encoded value representing the range into which the unencoded value falls.

By way of a non-limiting example, assume that real numbers are the possible values for a non-categorical field. The range of real numbers that encompass the possible real-number unencoded values can be split into a number of subranges, and each unencoded value can be encoded using an encoded (or encoding) value (e.g., subrange indicator) associated with the subrange into which the unencoded value falls (e.g., a value representing the subrange into which the unencoded value falls).

In accordance with one or more embodiments, each unencoded record is encoded by mapping each field's value to its corresponding encoded value. To further illustrate, in generating an encoded record, each unencoded value in the record is replaced by an encoded value based on the field corresponding to the unencoded value and the mapping determined for the corresponding field. The encoded record generation can be repeated to generate a set of encoded records from a set of unencoded records.

At this point, the fields of an encoded record have the same sequence as the fields of a corresponding unencoded record. In accordance with at least one embodiment, the fields (both the input and label fields) of the encoded record can be randomly shuffled (or reordered) to yield the encoded record. The randomly shuffling results in the encoded field sequence of each encoded record being different from each other and different from the certain sequence used for the corpus of unencoded records.

At step 406, which is performed by data engine 300, a corpus of encoded data resulting from the encoding performed at step 404 on the data collected at step 402 is transmitted to service engine 340. Service engine 340 can be a searching service (e.g., such as that provided by search server 120). In accordance with one or more embodiments, service engine 340 uses a classification machine learning algorithm operating in a manner discussed herein to search a corpus of encoded data (e.g., encoded records) to generate a search result in response to an encoded query.

At step 408, which is performed by query generation module of data engine 300, a query is generated and encoded. By way of a non-limiting example, the query comprises a number of input fields and at least one label field. By way of a non-limiting example, the input fields can comprise user data information, such as age, gender, income range, online browsing activity and each label field corresponds to the information being sought and output by the statistical machine learning algorithm. As discussed, a label field may comprise information that may or may not be inferred from the encoded information provided in the input fields of an encoded query.

By way of one non-limiting example, the encoded information in the query might be used to generate an inference (a result indicating) whether or not a user has an interest a type of content, e.g., including music, video, movies, concerts, etc. As yet a further non-limiting example, the content can be advertising content, and the inference might indicate whether or not a user might click on the ad content and/or whether the user might then buy a product from the ad content.

Embodiments of the present disclosure encode the query, at step 408, to provide further protection and privacy for the query as well as the corpus. The encoding of the query is much the same as the encoding used (at step 404) for a record from the corpus. For the query, input fields and label fields are encoded as discussed above. However and in accordance with at least one embodiment, the input fields and label fields are separated for purposes of reordering the fields. In particular, the input fields are randomly shuffled together and to the extent that the query includes multiple labels, the label fields are randomly shuffled separate from the random shuffling of the input fields.

To further illustrate, an unencoded query can be represented as (Q, Y), where Q represents the unencoded input field values and Y represents the unencoded label field value(s), The unencoded query, (Q, Y), can be encoded to generate an encoded query, (Q', Y'), comprising a set of encoded input field values, Q', and a set of encoded label field values, Y'.

As with an input field, a label field has a corresponding value that is encoded using the set of encoded values exclusively-assigned to the label field in accordance with a determined set of unencoded values of the label field. To further illustrate using the example discussed herein, assume that a label field is a third field whose encoded values are being assigned following the first and second fields, the first field has 2 (two) possible values assigned encoded values 0 and 1, the second field has 5 (five) possible values assigned encoded values 2-6 (two-six), and the third field (the label field) has three possible unencoded values a, b, and c, the label field's unencoded values can be mapped to encoded values 7 (seven), 8 (eight) and 9 (nine).

At step 410, which is performed by data engine 300, the encoded query is transmitted to the service engine 340. At step 412, which is performed by query result processing module 308 of data engine 300, a response to the query is received and processed. As discussed in more detail below, the query response comprises an estimated probability (or information to determine an estimated probability) for each label in the query. A label's estimated probability indicates a likelihood that an inference (e.g., a positive inference) can be made in connection with the label.

In accordance with one or more embodiments, a response to a query comprises an estimate corresponding to an encoded value corresponding to a label field in the set of label fields, where the estimate represents an indication whether the encoded value of the label field is can be inferred given the encoded values of the encoded query.

An estimated probability threshold can be used to determine whether or not the label is positive or negative (e.g., whether or not an inference can be made). By way of a non-limiting example, if the estimated probability exceeds the threshold, then the label is positive (and the inference can be made). If the estimated probability is less than the threshold, the label is negative (and the inference cannot be made).

Where the inference sought in connection with a label field is whether the user has an interest in some type of content, a positive label (or positive inference) can indicate that the user likely has an interest, and a negative label (or negative inference) can indicate that the user likely does not. By way of a further non-limiting, example, a positive label (or positive inference) can indicate that a user is likely to click on advertising content and/or is likely to purchase an advertised product after clicking on the advertising content.

In accordance with one or more embodiments, if the estimated probability is equal to the threshold, a positive or negative inference can be randomly selected.

Figure 5:
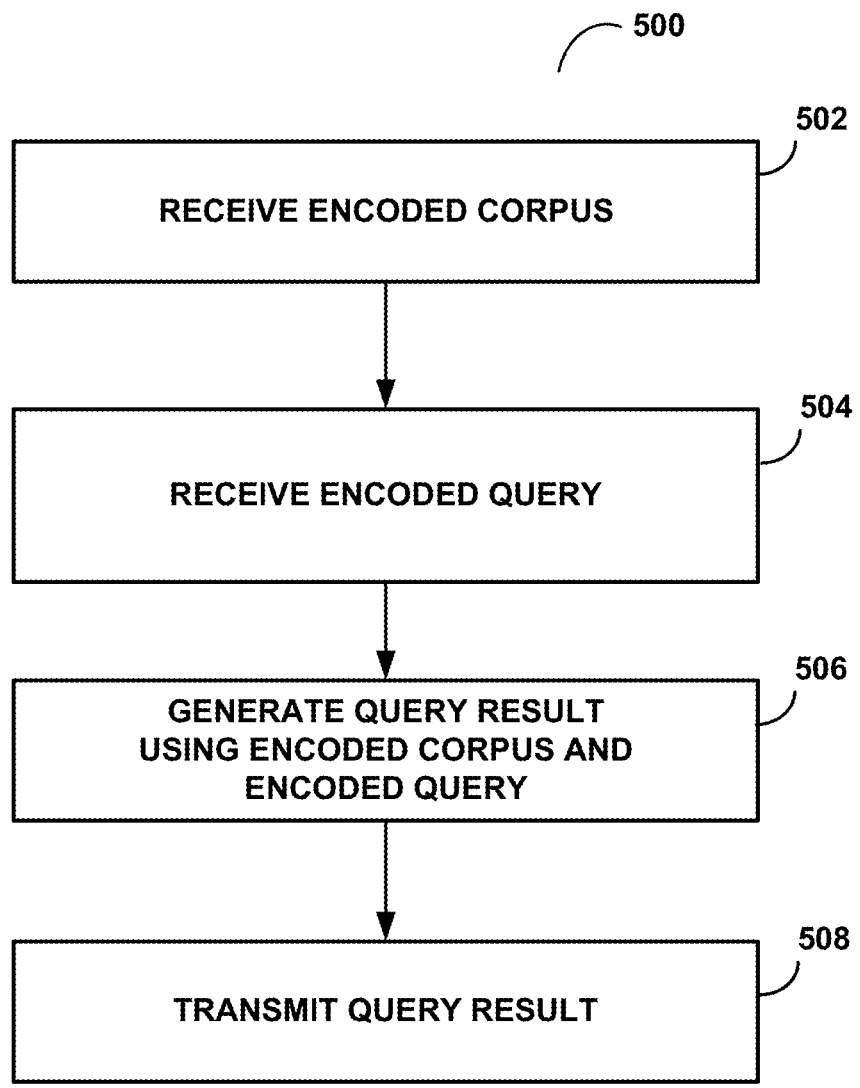

FIG. 5 provides a process flow overview in accordance with one or more embodiments of the present disclosure. As with process 400 of FIG. 4, process 500 of FIG. 5 details steps performed in accordance with exemplary embodiments of the present disclosure for privacy-aware machine learning using an improved data encoding that withholds more information. According to some embodiments, as discussed herein with relation to FIG. 5, the process involves receiving an encoded corpus (a set of encoded data, referred to as encoded records herein), receiving an encoded query, and generating a query result using the encoded data and a statistical machine learning algorithm (e.g., a k-NN classifier operating in a manner discussed herein), and transmitting the query result to the requester (e.g., data engine 300). In accordance with one or more embodiments, the query result is generated using the encoded corpus.

In accordance with one or more embodiments, the machine learning algorithm is a classification-type algorithm. By way of a non-limiting example, the classification (or classifier) is a histogram-type classification (or classifier), a k-nearest neighbors classifier, etc.). In the case of a k-nearest neighbor (k-NN) classifier, a lazy learning method can be used, such that the training of the classifier can be delayed until a response to a query is to be generated. Lazy classifiers are useful for large, continuously changing training datasets and typically using a smaller (rather than larger) set of the fields being used for a query.

At step 502, an encoded corpus is received by service engine 340 (e.g., from data engine 300). At step 504, an encoded query is received by service engine 340 (e.g., from data engine 300). At step 506, which is performed by module 344 of service engine 340, a query result is generated using the encoded corpus and query received by service engine 340.

As discussed and in accordance with one or more embodiments, a k-NN classifier is modified to use those encoded records (from the corpus) within a minimum distance, d, of the search query, where the minimum distance, d, is selected to yield at least a number, n, of those encoded records from the corpus. The classifier can be used (e.g., by service engine 340) with a corpus of encoded records (e.g., the encoded corpus received at step 502) to generate a response to an encoded query, (Q', Y'), such as the query received at step 504. One example of a query result generation is provided in connection with FIGS. 6 and 7, discussed below.

In accordance with one or more embodiments, a search of the corpus is performed to identify at least the number, n, of encoded records that are (relative to other encoded records in the corpus) the most similar to (or least divergent from) the encoded search query. The identified encoded records are within a minimum distance, d, of the search query. The identified encoded records are then used to determine a positive label frequency, p, indicating the number of the n encoded records sharing at least one label with the search query. An encoded record that shares at least one label with the search query can be referred to herein as positive example or a positive vote. By way of a further non-limiting example, n can be considered to be the number of voting examples, and p can be considered to be the number of positive votes.

By way of one non-limiting example, p=100 (one hundred) and n=101 (one hundred and one) indicates that a search using encoded query, (Q', Y'), used 101 (one hundred and one) encoded records (from the corpus) to determine that 100 (one hundred) of the 101 (one hundred and one) encoded records had at least one encoded label value that matched at least one encoded label from the encoded query.

In accordance with at least one embodiment, divergence (or similarity) can be determined using the input fields, Q', of the encoded query, (Q', Y'). The classifier can use a parameter, $n_{min}$, which represents a minimum acceptable value of n—the number of encoded records used to determine the positive label frequency, p, indicating the number of the n encoded records sharing at least one label with the search query. The value, $n_{min}$, mediates a tradeoff: a higher value generally causes more encoded records to be used for classification; a lower value generally causes more-similar encoded records to be used.

In an effort to use the least divergent encoded records to determine the positive label frequency, p, for query (Q', Y'), the classifier can initially consider those encoded records including all of the encoded values in Q' in X', which can be expressed as Q'⊆X'. In such a case, the distance, d, is 0 (zero). If there are fewer than $n_{min}$ encoded records in the corpus of encoded records that include all of the encoded values in Q', the classifier can then search for those encoded records that have all but one of the encoded values of Q', which can be expressed as |Q'−X'|≤1. In such as case, the distance, d, is 1 (one).

Figure 7:
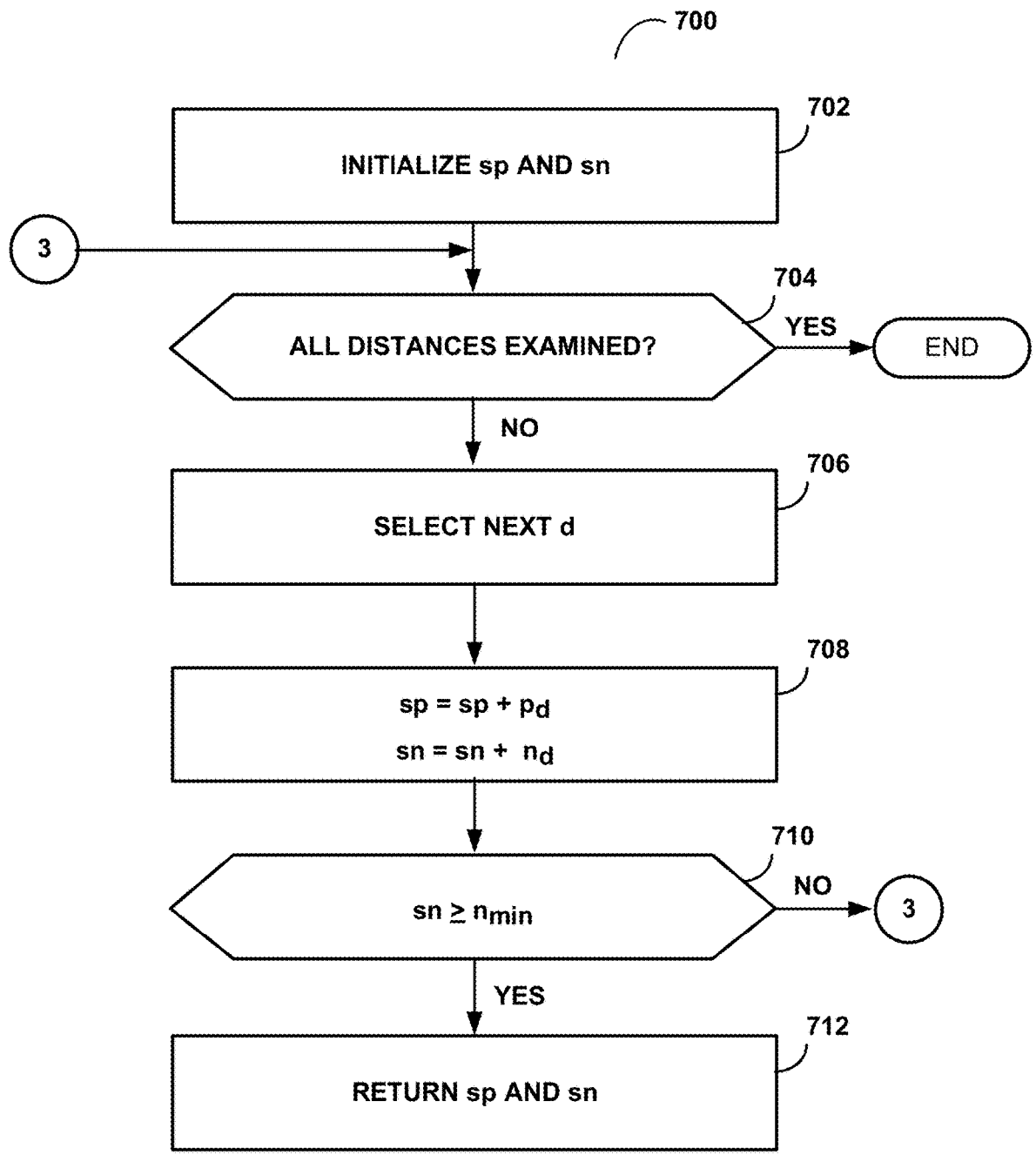
Figure 8:
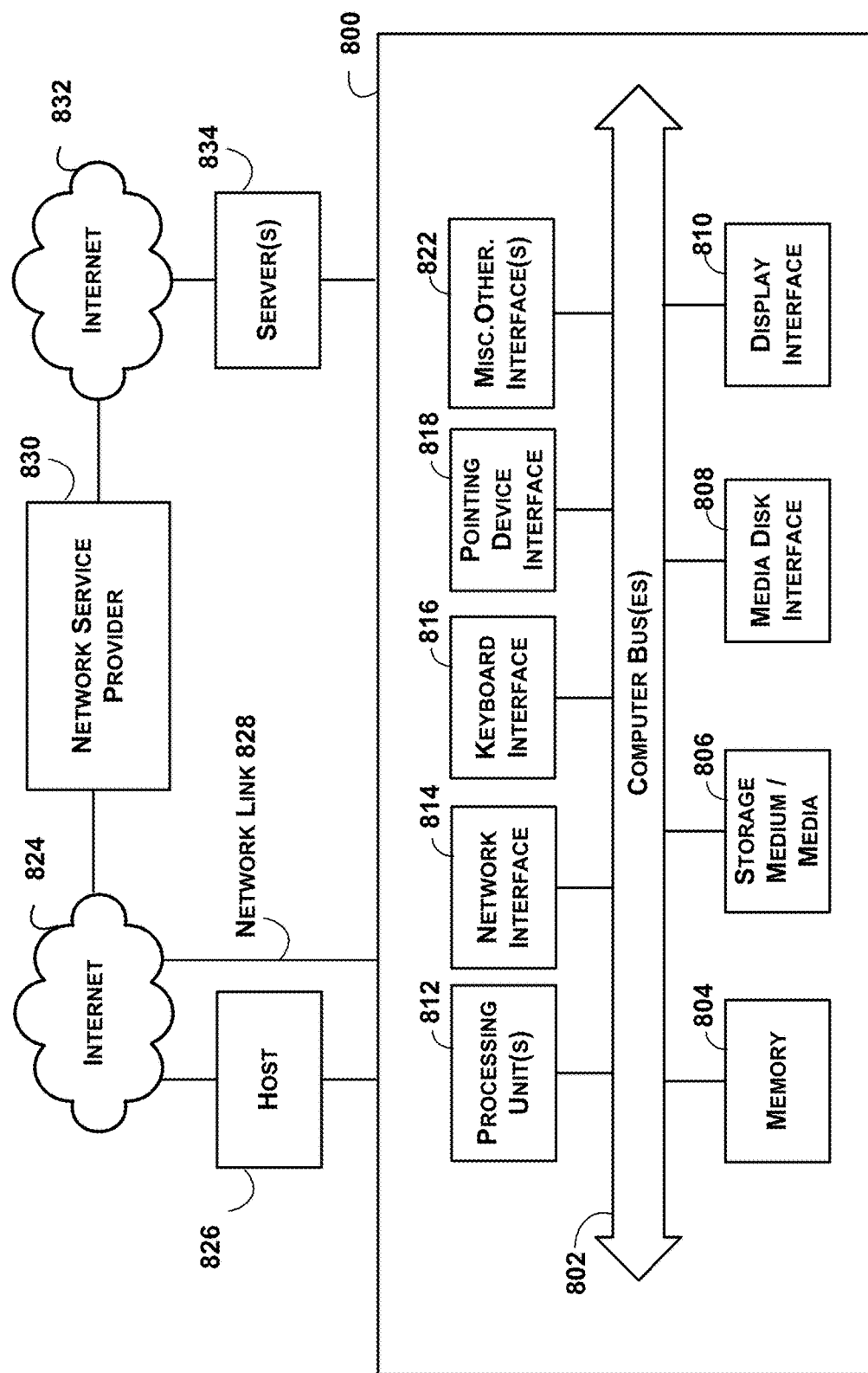
FIG. 8 is a block diagram illustrating the architecture of an exemplary hardware device in accordance with one or more embodiments of the present disclosure.

The classifier can continue to expand the search if there are fewer than $n_{min}$ encoded records. If, for example, the minimum number of encoded records is not satisfied in the second round, a third round can include those encoded records (from the corpus) having all but two of the encoded values of the encoded query, Q', which can be expressed as |Q'−X'|≤2, and so on. FIGS. 7 and 8 provide additional description of this process.

For additional privacy, p and n can be encoded (for example, using public-key cryptography, or encryption, before being sent as a response to the query. The value $$\frac{p}{n}$$

(i.e., p divided by n) can be used as an estimate of the probability that a label from the encoded search query can be inferred to be a positive label.

Figure 6:
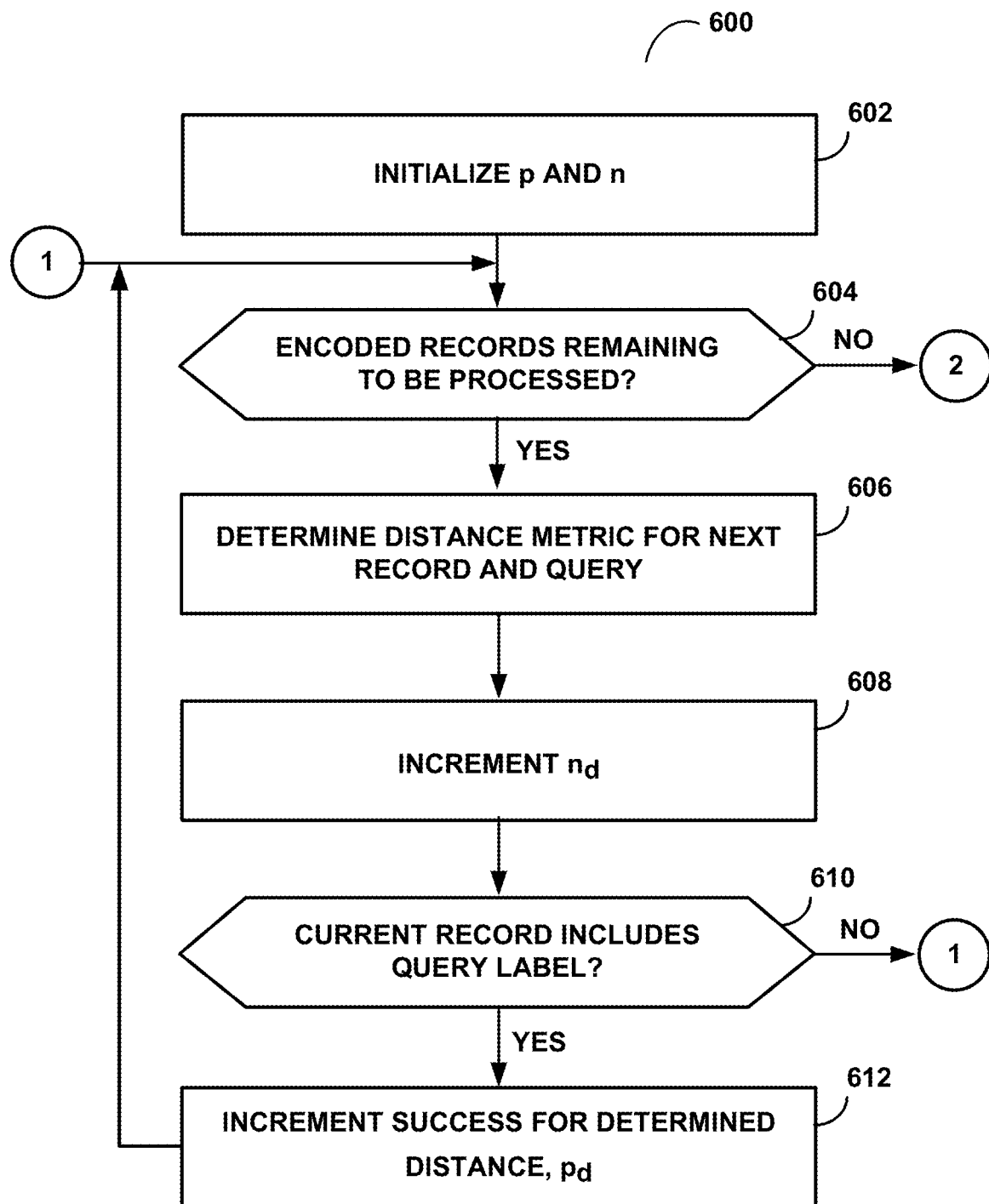

FIGS. 6 and 7 provide an exemplary example of process flow overview illustrating processes 600 and 700 used by a classifier (or other statistical machine learning algorithm) of the service engine 340. In accordance with one or more embodiments, processes 600 and 700 are performed by module 344 of service engine 340.

Referring to FIG. 6, at step 602, positive label frequency, p, represents the number of the n encoded records (from the corpus) sharing at least one a label with the encoded search query and the number, n, represents the number of encoded records (e.g., encoded records from the corpus received by the service engine 340) used to determine p. Initially, these two variables are initialized (e.g., each set to 0 (zero)) at step 602.

In accordance with one or more embodiments, each encoded record from the corpus of encoded records is searched to determine the number of encoded input values, Q', absent, or missing, from the encoded record. For a given encoded record, the number of missing input values can be represented using the variable, d. The determination made for each encoded record can be expressed using Expression (1) or Expression (2), both of which are discussed in more detail below.

In accordance with one or more embodiments, p and n are vectors (in the exemplary process flows shown in FIGS. 6 and 7), where each field in each of the vectors represents a distance (i.e., number of encoded values of Q' missing from an encoded record of the corpus of encoded records).

At step 604, a determination is made whether any encoded records remain to be processed from the corpus of encoded records. If so, processing continues at step 606 to determine a distance, d, value for a next encoded record from the corpus. In accordance with at least one embodiment, the distance, d, is a measure of the number of encoded values of Q' missing from the encoded record.

In accordance with one or more embodiments, the following expression represents one approach that can be used in determining a distance, d, for an encoded query, Q', and an encoded record, X':

$$d=|Q'-X'|, \qquad \text{Expression (1)}$$

where d is a measure (or metric) of the distance (or divergence) between an encoded record, X', and encoded input values, Q'—the encoded input values corresponding to the input fields of the encoded query. By way of a non-limiting example, the measure determined for the encoded record, X', can be determined by searching the encoded record, X', for each encoded value from Q', and incrementing the distance metric corresponding to the encoded record, X', by 1 (one) each time an encoded value from Q' is not found in the encoded record, X'. In accordance with at least one embodiment, each encoded record, X', from the corpus is searched to generate a corresponding distance measure, which can be used to determine whether the encoded record, X', is to be included in the determination of a positive label frequency, p, and an estimated probability for a label field of the encoded query.

The distance metric used in Expression (1) is an unweighted measurement, in the sense that each encoded value in Q' that is missing from the encoded record, X', makes the same contribution to the determination of the corresponding distance metric.

In some embodiments, a weighted divergence can be used, so that one missing encoded value makes a smaller (or larger) contribution than another missing encoded value. To use a weighted divergence, the following expression can be used to determine a measure of divergence:

$$d=\Sigma_{q' \in Q'} w(q') I(q' \notin X'), \qquad \text{Expression (2)}$$

where I( ) is an indicator function that has a value of 1 (one) if the argument is true and 0 (zero) otherwise, and w(q') is a weighting function that applies a weight to each encoded field, q', of the encoded input field values, Q', of the encoded query.

Expression (2) assumes that there is a weight for each field (or query term), q', in the encoded input field values, Q'. One or more metric learning methods can be used with the corpus of encoded records to find weight values that enhance classification. In a case that a service provider uses the learning methods, the service provider may need to learn from the data provider which encoded values, x', are used as labels in order to use the one or more metric learning methods more effectively. Alternatively, the data provider can provide sample encoded queries with correct labels, and the machine learning data provider can tune the weights based on accuracy over those sample queries.

If the weights are allowed to have arbitrary values, then the distance metric value, d, can take on a wide variety of values, leading storage of many $p_d$ and $n_d$ values. To reduce storage and speed computation, the weights cam be discretized (e.g., restricted to a set of possible weight values), store $p_d$ and $n_d$ values for ranges of d-values rather than single values, or both.

The simplest of weightings uses 0 (zero) and 1 (one) with 0 (zero) indicating that a field plays no role in classification, and 1 (one) indicating that a field plays a role—an equal role (with each other field having a weight of 1 (one) in classification). This type of weighting can be considered a form of feature selection. The weights themselves can be valuable information for the data provider. Larger weights generally indicate field values that are more important for accurate classification. So the machine learning service provider may communicate the weights to the data provider, to aid the data provider in decisions about which fields to collect, or to encode and send, in the future.

At step 608, the number of records searched that yielded the distance metric determined at step 606 is incremented. To further illustrate, at any given point, $n_d$, represents the number of the encoded records determined (at step 606) to have a distance measure equal to d. By way of further illustration and in the example shown in FIG. 6, d can have a value of 0 (zero), 1 (one), etc. and each value of d can have a corresponding number of encoded records determined to be missing d of the query input field values, Q', which can be represented as, $n_d$, where d represents the distance metric value determined at step 606 and n is a current number of encoded records examined that yielded d.

In accordance with one or more embodiments, a distance metric value is determined for each encoded record of the corpus of encoded records, where the distance metric value indicates a number of the set of encoded input field values, Q', of the encoded query missing from a set of encoded field values of the encoded record.

At step 610, a determination is made whether or not the current encoded record (from the corpus) that is being examined matches at least one of the query's label field values, Y'. By way of some non-limiting example, the determination can be made by searching the encoded record, X', to determine whether it includes one or more of the encode query's label field values, Y'. In a case that the encoded record, X', does not include any of the encoded labels in the set of encoded labels, Y' from the encoded query, processing continues at step 604 to process any remaining encoded records from the corpus.

In a case that it is determined (at step 608) that the encoded record, X', does include one or more of the encoded label field values, Y' from the encoded query, step 612 is performed to increment a positive label frequency, $P_d$, associated with the distance metric value determined for the encoded record, X' (at step 606). In the example shown in FIG. 6, each distance metric has a corresponding p value, which is represented as, $P_d$, where d represents the distance metric value determined at step 606 and p is the number of encoded records determined to be d distance from the encoded query and to include at least one of the encoded label field values, Y', from the encoded query.

In accordance with at least one embodiment, each encoded record in the corpus has a value for p indicating whether or not at least one of the encoded label field values, Y', is present in the encoded record, e.g., in the encoded field values of the encoded record.

Processing then continues at step 604 to process any remaining records from the corpus.

If it is determined at step 604 that there are no remaining encoded records from the corpus to be processed, processing continues at step 702 of process 700, which determines a value of p and n for determining a response to the encoded search query. In accordance with one or more embodiments, the value of p is determined using the encoded records included in the number, n, encoded records determined to be the least divergent (within the minimum distance, d) from the input field values, Q', of the encoded query.

In accordance with at least one embodiment, the threshold, $n_{min}$, represents a minimum number of encoded records to be used to determine the value of p. In accordance with at least one embodiment, the minimum distance, d, is determined in accordance with the threshold $n_{min}$. The minimum distance, d, can be considered to be the value of d that yields a number, n, encoded records satisfying the threshold $n_{min}$. A higher threshold can result in more divergent encoded records being used in determining the value of p. A lower threshold can result in less divergent encoded records being used. The value of $n_{min}$ can be changed to achieve a desired level of divergence.

At step 702, a working positive label frequency, sp, and a working encoded record number, sn, are initialized to 0 (zero). At step 704, a determination is made whether or not all of the distance metric values have been considered. If not processing continues at step 706 to select the next distance metric value. In accordance with one or more embodiments, the value of d starts at 0 (zero) and can increase, where a value of 0 (zero) indicates an exact match between the encoded query's encoded input field values, Q', and an encoded record from the corpus. The values of d used at step 606 begin with an initial value of 0 (zero), which represents the least divergence.

If it is determined (at step 704) that all of the values of d have been examined, the processing can end. In this case, all of the values of d were considered, but the classifier was unable to generate an acceptable query response. An error message can be transmitted to the query requester (e.g., data engine 300). If it is determined (at step 710) that sn does not satisfy the minimum threshold number, $n_{min}$, may be tweaked to avoid an error.

At step 708, the working positive label frequency, sp, is increased by the positive label frequency, $P_d$, associated with the current d, and the working number of encoded records, sn, used to determine the frequency is incremented by the number, $n_d$, of encoded records determined to be missing the number, d, of the encoded input field values, Q', from the encoded query. As discussed in connection with step 612 of FIG. 6, the positive label frequency, $P_d$, represents the number of encoded records determined to be missing d of the labels (from the search query) and to have at least one of the encoded label field values, Y', from the encoded query. The number of encoded records, $n_d$, represents the number of encoded records determined to be missing d of the input field values, Q', of the encoded query.

At step 710, a determination is made whether or not the working number of encoded records, sn, is at least equal to a minimum number of records, $n_{min}$. As discussed, the classifier can use a parameter, $n_{min}$, which represents a minimum acceptable number of encoded records to be used in determining the positive label frequency (e.g., p or sp).

As discussed, for query (Q', Y'), and each encoded record, X', in the corpus, the classifier can start with a distance, d, equal to 0 (zero) indicating all encoded values in Q' are found in an encoded record, X', which can be expressed as Q'⊆X'. If there are fewer than $n_{min}$ such encoded records in the corpus of encoded records, the classifier can then search for and include any encoded record, X', (from the corpus) having all but one of the members (i.e., encoded input values) of Q', which can be expressed as |Q'−X'|≤1. The classifier can continue to expand the set of encoded records used to determine positive label frequency, p, if there are fewer than $n_{min}$ encoded records. If, for example, the minimum number of encoded records, $n_{min}$, is not satisfied in the second round (corresponding to |Q'−X'|≤1), a third round can use encoded records (from the corpus) having all but two of the members, and so on.

Thus, if it is determined (at step 710) that sn does not satisfy the minimum threshold number, $n_{min}$, processing continues at step 704 to consider greater distances (e.g., encoded records having fewer of the encoded values from Q' of the encoded query). If it is determined (at step 710) that sn does satisfy the minimum threshold number, $n_{min}$, the working positive label frequency, sp, and the working number of records examined, sn, are returned, at step 712, to the requester (e.g., data engine 300), as the positive label frequency, p, and the number of encoded records, n, resulting from the search query.

In accordance with one or more embodiments, using process 700 of FIG. 7, a set of encoded records is selected from the corpus of encoded records, each encoded record from the selected set has a distance metric corresponding to a distance metric value of a set of distance values selected in accordance with the minimum threshold number, $n_{min}$, of encoded records to be included in the set of encoded records. The positive label frequency, p, can be determined using the positive label determination made for each encoded record selected for inclusion in the selected set of encoded records, where each encoded record's positive label determination indicates whether or not the encoded record includes at least one of the input field values, Q', of the encoded query. The set of distance values selected is iteratively determined with the first distance metric value selected representing a least distance metric value and any distance value metric selected thereafter represents a lesser distance metric value than any unselected distance metric value.

As discussed and in accordance with one or more embodiments, the systems and methods then use the query response to determine a result. The query response can specify the number, n, of encoded records used to determine the positive label frequency, p, the latter of which indicating the number of the n encoded records having at least one encoded label in common with the query. The data provider can then use p and n to determine whether the result of the query indicates a positive label (or positive inference in connection with a label of the encoded query), or conversely a negative result.

For example, the systems and methods can determine an estimate probability, $$\frac{p}{n},$$

determined using the p and n values received in response to the encoded query together with a probability threshold to classify the result of the encoded query, (Q', Y'). For example, if $$\frac{p}{n}$$

is greater than the probability threshold, then a positive result can be concluded indicating that the query encoded by Q' can be inferred to have a positive label encoded by Y'.

By way of a non-limiting example, an exemplary threshold (which can be used as a default) can be ½ (or 50%), where an estimated probability above the threshold yields a positive result, an estimated probability below the threshold yields a negative result, and a 50% estimated probability can yield either a positive or negative result (either of which can be randomly selected).

In accordance with at least one embodiment, lower thresholds can be used when false positives are less costly than false negatives, and higher thresholds can be used when the opposite holds. In many cases, it is useful to have p and n rather than (or in addition to) a classification decision, because together p and n provide information about a confidence level for the query result.

In accordance with one or more embodiments, the query result can be used by the data provider. By way of one non-limiting example, estimated probability determined by the classifier can be used together with a threshold to determine whether the query label can be inferred in light of the set of encoded input fields, Q', or not.

Referring again to FIG. 5, at step 508, which is performed by service engine 340, the query is transmitted to the requester (e.g., data engine 300).

In accordance with one or more embodiments, a corpus of encoded records can be sufficiently large that a classifier based only on a subset of the encoded records is considered to provide an acceptable level of accuracy. In such a case, using the entire corpus of encoded records as the basis of the classifier can be inefficient. Similarly, storing the entire corpus in encoded form with the machine learning service provider can also be inefficient. Accordingly and in accordance with at least one embodiment, the data provider can use reservoir sampling to select a sample (coreset) of the corpus to encode and transmit to the service provider. An iterative process can be used by the data provider—send a portion of the encoded records generated from the corpus, check accuracy on sample queries, and repeat while there is significant (in terms of the application) improvement in accuracy without excessive cost in storage and classification speed. Using only a subset of the data also increases security.

As shown in FIG. 8, internal architecture 800 of a computing device(s), computing system, computing platform, user devices, set-top box, smart TV and the like includes one or more processing units, processors, or processing cores, (also referred to herein as CPUs) 812, which interface with at least one computer bus 802. Also interfacing with computer bus 802 are computer-readable medium (or media) 806, network interface 814, memory 804, e.g., random access memory (RAM), run-time transient memory, read only memory (ROM), media disk drive interface 808 as an interface for a drive that can read and/or write to media including removable media such as floppy, CD-ROM, DVD, media, display interface 810 as interface for a monitor or other display device, keyboard interface 816 as interface for a keyboard, pointing device interface 818 as an interface for a mouse or other pointing device, and miscellaneous other interfaces 822 not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein. CPU 812 first loads computer executable process steps from storage, e.g., memory 804, computer readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 828 typically provides information communication using transmission media through one or more networks to other devices that use or process the information. For example, network link 828 may provide a connection through local network 824 to a host computer 826 or to equipment operated by a Network or Internet Service Provider (ISP) 830. ISP equipment in turn provides data communication services through the public, worldwide packet-switching communication network of networks now commonly referred to as the Internet 832.

A computer called a server host 834 connected to the Internet 832 hosts a process that provides a service in response to information received over the Internet 832. For example, server host 834 hosts a process that provides information representing video data for presentation at a display coupled to display interface 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 812 as it is received, or may be stored in memory 804 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
obtaining, by a computing device, sensitive data comprising a plurality of records, each record, of the plurality of records, comprising a plurality of unencoded values corresponding to a plurality of fields of the record;
determining, via a computing device and using the sensitive data, a set of unencoded values for each field of the plurality of fields;
determining, via the computing device, a set of encoded values for each field, of the plurality of fields, the determining comprising using the set of unencoded values determined for a respective field to determine the set of encoded values for the respective field;
generating, via the computing device, a plurality of encoded records corresponding to the plurality of records comprising sensitive data, the generating comprising replacing each unencoded value in the plurality of records with an encoded value based on the set of encoded values determined for the plurality of fields; and
retrieving, via the computing device, a set of search results using an encoded query to search the plurality of encoded records.

2. The method of claim 1, an ordering of the plurality of fields in an encoded record differs from the ordering of the plurality of fields in each other encoded record.

3. The method of claim 2, generating the plurality of encoded records further comprising:
randomly shuffling an initial ordering of the plurality of fields in each encoded record of the plurality of encoded records.

4. The method of claim 1, an ordering of the set of fields in an encoded record differs from the ordering of the set of fields in an unencoded record used to generate the encoded record.

5. The method of claim 1, the determining a set of encoded values further comprising determining a set of encoded values exclusive to each field of the plurality of fields.

6. The method of claim 1, further comprising:
generating, via the computing device and for each field of the plurality of fields, a mapping between the set of encoded values and the set of unencoded values, the mapping being used in generating the plurality of encoded records.

7. The method of claim 1, further comprising:
using, via the computing device, the plurality of encoded records and a machine learning algorithm to train a machine model to generate the search results in response to the encoded query.

8. The method of claim 7, the machine learning algorithm is a classification algorithm.

9. The method of claim 1, the encoded query comprising a set of encoded input fields values and a set of encoded label fields.

10. The method of claim 9, generating the encoded query further comprising:
randomly shuffling an ordering of the set of input fields of the encoded query; and
randomly shuffling an ordering of the set of label fields of the encoded query.

11. The method of claim 1, the search results comprising at least one user preference determined from the encoded search query comprising encoded user information.

12. The method of claim 1, determining the set of encoded values for a respective field comprising:
determining, via the computing device, a set of non-categorical values for the respective field using the plurality of records;
determining, via the computing device, a range for the set of non-categorical values;
determining, via the computing device, a set of subranges using the determined range;
associating, via the computing device, the set of subranges with the set of encoded values for the respective field.

13. The method of claim 12, generating a plurality of encoded records further comprising:
generating, via the computing device, an encoded value for the respective field using the set of encoded values for the respective field, the generating comprising:
determining, via the computing device, a subrange, from the set of subranges, corresponding to a value of the respective field; and
encoding, via the computing device, the respective field using the encoded value, from the set of encoded value determined for the respective field, that corresponds to the determined subrange.

14. A non-transitory computer-readable storage medium tangibly encoded with computer-executable instructions that when executed by a processor associated with a computing device perform a method comprising:
obtaining sensitive data comprising a plurality of records, each record, of the plurality of records, comprising a plurality of unencoded values corresponding to a plurality of fields of the record;
determining, using the sensitive data, a set of unencoded values for each field of the plurality of fields;
determining a set of encoded values for each field, of the plurality of fields, the determining comprising using the set of unencoded values determined for a respective field to determine the set of encoded values for the respective field;
generating a plurality of encoded records corresponding to the plurality of records comprising sensitive data, the generating comprising replacing each unencoded value in the plurality of records with an encoded value based on the set of encoded values determined for the plurality of fields; and
retrieving a set of search results using an encoded query to search the plurality of encoded records.

15. The non-transitory computer-readable storage medium of claim 14, an ordering of the plurality of fields in an encoded record differs from the ordering of the plurality of fields in each other encoded record.

16. The non-transitory computer-readable storage medium of claim 14, an ordering of the set of fields in an encoded record differs from the ordering of the set of fields in an unencoded record used to generate the encoded record.

17. The non-transitory computer-readable storage medium of claim 14, the determining a set of encoded values further comprising determining a set of encoded values exclusive to each field of the plurality of fields.

18. The non-transitory computer-readable storage medium of claim 14, the method further comprising:
   using, via the computing device, the plurality of encoded records and a machine learning algorithm to train a machine model to generate the search results in response to the encoded query.

19. The non-transitory computer-readable storage medium of claim 14, the search results comprising at least one user preference determined from the encoded search query comprising encoded user information.

20. A computing device comprising:
   a processor; and
   a non-transitory storage medium for tangibly storing thereon program logic for execution by the processor, the program logic comprising:
      obtaining logic executed by the processor for obtaining sensitive data comprising a plurality of records, each record, of the plurality of records, comprising a plurality of unencoded values corresponding to a plurality of fields of the record;
      determining logic executed by the processor for determining, using the sensitive data, a set of unencoded values for each field of the plurality of fields;
      determining logic executed by the processor for determining a set of encoded values for each field, of the plurality of fields, the determining comprising using the set of unencoded values determined for a respective field to determine the set of encoded values for the respective field;
      generating logic executed by the processor for generating a plurality of encoded records corresponding to the plurality of records comprising sensitive data, the generating comprising replacing each unencoded value in the plurality of records with an encoded value based on the set of encoded values determined for the plurality of fields; and
      retrieving logic executed by the processor for retrieving a set of search results using an encoded query to search the plurality of encoded records.

\* \* \* \* \*